United States Patent
Ikefuji et al.

(10) Patent No.: US 11,460,573 B2
(45) Date of Patent: Oct. 4, 2022

(54) SYNTHETIC APERTURE RADAR SIGNAL PROCESSING DEVICE AND METHOD

(71) Applicant: NEC Corporation, Tokyo (JP)

(72) Inventors: Daisuke Ikefuji, Tokyo (JP); Taichi Tanaka, Tokyo (JP); Osamu Hoshuyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 168 days.

(21) Appl. No.: 16/771,450

(22) PCT Filed: Oct. 10, 2018

(86) PCT No.: PCT/JP2018/037716
§ 371 (c)(1),
(2) Date: Jun. 10, 2020

(87) PCT Pub. No.: WO2019/123786
PCT Pub. Date: Jun. 27, 2019

(65) Prior Publication Data
US 2021/0072376 A1 Mar. 11, 2021

(30) Foreign Application Priority Data
Dec. 18, 2017 (JP) .............................. JP2017-241434

(51) Int. Cl.
| | | |
|---|---|---|
| *G01S 13/90* | (2006.01) | |
| *G01S 13/00* | (2006.01) | |
| *G01S 13/88* | (2006.01) | |

(52) U.S. Cl.
CPC ........ *G01S 13/9023* (2013.01); *G01S 13/003* (2013.01); *G01S 13/885* (2013.01)

(58) Field of Classification Search
CPC ............... G01S 13/9023; G01S 13/003; G01S 13/885

(Continued)

(56) References Cited

U.S. PATENT DOCUMENTS

| | | | | |
|---|---|---|---|---|
| 4,594,593 A | * | 6/1986 | Nohmi ...................... | G09B 9/54 |
| | | | | 342/25 D |
| 4,723,124 A | * | 2/1988 | Boles .................. | G01S 13/9023 |
| | | | | 342/25 C |
| 6,264,143 B1 | * | 7/2001 | Massonnet ............ | G01S 13/003 |
| | | | | 342/354 |

(Continued)

FOREIGN PATENT DOCUMENTS

| | | | | |
|---|---|---|---|---|
| EP | 2942638 A1 | * | 11/2015 | ............. G01S 13/90 |
| GB | 2497003 A | * | 5/2013 | ............. G01S 13/42 |

(Continued)

OTHER PUBLICATIONS

Japanese Office Action for JP Application No. 2019-560820 dated Jan. 26, 2021 with English Translation.

(Continued)

*Primary Examiner* — Peter M Bythrow
*Assistant Examiner* — Nuzhat Pervin
(74) *Attorney, Agent, or Firm* — Sughrue Mion, PLLC

(57) ABSTRACT

A synthetic aperture radar signal processing device 10 includes a persistent scatterer extraction unit 11 which extracts, from time-series observation data related to an observation target observed from a plurality of observation directions by a radar, a plurality of persistent scatterers in respective observation directions; a persistent scatterer grouping unit 12 which groups the plurality of persistent scatterers in each of the observation directions; a group selection unit 13 which selects, in each of the observation directions, a persistent scatterer group that includes the persistent scatterers included in an analysis target from among groups generated by grouping; and a displacement speed processing unit 14 which synthesize displacement speeds of the selected persistent scatterer groups.

9 Claims, 10 Drawing Sheets

(58) Field of Classification Search
USPC .................................................. 342/25 R
See application file for complete search history.

(56) References Cited

U.S. PATENT DOCUMENTS

| | | | | |
|---|---|---|---|---|
| 6,512,996 | B1* | 1/2003 | Praskovsky | G01S 17/95 |
| | | | | 702/189 |
| 6,583,751 | B1* | 6/2003 | Ferretti | G01S 13/9023 |
| | | | | 342/25 R |
| 7,768,442 | B2* | 8/2010 | Stickley | G01S 13/89 |
| | | | | 342/28 |
| 8,482,453 | B2* | 7/2013 | Costantini | G01S 13/9023 |
| | | | | 342/25 R |
| 8,711,029 | B2* | 4/2014 | Ferretti | G01S 13/904 |
| | | | | 342/25 C |
| 8,860,604 | B2* | 10/2014 | Oswald | G01S 13/87 |
| | | | | 342/107 |
| 10,585,171 | B2* | 3/2020 | Oswald | G01S 13/951 |
| 2005/0237236 | A1* | 10/2005 | Budic | G01S 13/5244 |
| | | | | 342/159 |
| 2010/0265122 | A1* | 10/2010 | Oswald | G01S 13/87 |
| | | | | 342/136 |
| 2011/0163911 | A1* | 7/2011 | Costantini | G01S 13/9023 |
| | | | | 342/25 C |
| 2011/0298655 | A1* | 12/2011 | Leva | G01S 13/9023 |
| | | | | 342/25 C |
| 2012/0019410 | A1* | 1/2012 | Ferretti | G01S 13/904 |
| | | | | 342/25 C |
| 2013/0082858 | A1* | 4/2013 | Chambers | G06N 99/00 |
| | | | | 342/22 |
| 2015/0323665 | A1* | 11/2015 | Murata | G01S 7/025 |
| | | | | 342/25 A |
| 2015/0323666 | A1* | 11/2015 | Murata | G01S 7/025 |
| | | | | 342/25 C |
| 2016/0033639 | A1* | 2/2016 | Jung | G01S 13/9023 |
| | | | | 342/25 C |
| 2017/0285158 | A1* | 10/2017 | Halbert | G01S 7/414 |

FOREIGN PATENT DOCUMENTS

| | | | | |
|---|---|---|---|---|
| JP | H09-189762 A | | 7/1997 | |
| JP | 2002-181929 A | | 6/2002 | |
| JP | 2015215210 A | * | 12/2015 | ......... G01S 13/9023 |
| JP | 2016-090361 A | | 5/2016 | |
| JP | 2017-049089 A | | 3/2017 | |
| JP | 6349937 B2 | * | 7/2018 | ......... G01S 13/9023 |
| WO | WO-2008145993 A2 | * | 12/2008 | ............ G01S 13/42 |
| WO | WO-2009144435 A1 | * | 12/2009 | ............ G01S 13/42 |
| WO | WO-2015008310 A1 | * | 1/2015 | ......... G01S 13/9023 |
| WO | WO-2016030656 A1 | * | 3/2016 | ........... G01S 13/003 |

OTHER PUBLICATIONS

International Search Report for PCT Application No. PCT/JP2018/037716, dated Dec. 11, 2018.

Masayuki Yamanaka et al., "Detection of ground subsidence by InSAR time series analysis", Journal of the Geospatial Information Authority of Japan, Dec. 27, 2013, vol. 124, pp. 1-14.

Satoshi Fujiwara et al., "2.5-D surface deformation of M6.1 earthquake near Mt Iwate detected by SAR interferometry", Geophysical Research Letters, vol. 27, No. 14, pp. 2049-2052, Jul. 15, 2000, Japan.

Alessandro Ferretti et al., "Permanent scatterers in SAR interferometry", IEEE Transactions on Geoscience and Remote Sensing, 39, No. 1, Jan. 2001, pp. 8-20, 2001, USA.

T. Tanaka et al., "Persistent Scatterer Clustering for Structure Displacement Analysis Based on Phase Correlation Network", 2017 IEEE international Geoscience and Remote Sensing Symposium (IGARSS), IEEE, Jul. 23, 2017, pp. 4618-4621, USA.

Lu, Ping et al., "Persistent Scatterers Interferometry Hotspot and Cluster Analysis (PSI-HCA) for detection of extremely slow-moving landslides", International Journal of Remote Sensing, Jan. 20, 2012, vol. 33, No. 2, pp. 466-489, Italy.

* cited by examiner

SYNTHETIC APERTURE RADAR SIGNAL PROCESSING DEVICE AND METHOD

This application is a National Stage Entry of PCT/JP2018/037716 filed on Oct. 10, 2018, which claims priority from Japanese Patent Application 2017-241434 filed on Dec. 18, 2017, the contents of all of which are incorporated herein by reference, in their entirety.

TECHNICAL FIELD

The present invention relates to a signal processing device and a signal processing method for signal-processing on observation data in synthetic aperture radar.

BACKGROUND ART

Synthetic aperture radar (SAR) technology is a technology for artificially synthesizing to produce an aperture so as to obtain an image equivalent to the image by an antenna having a large aperture, when a flying object (artificial satellite, aircraft, etc.) transmits and receives a radio wave while it moves. The synthetic aperture radar is utilized, for example, for imaging ground surface undulations, structures, etc. by converting strength of the reflected waves from the ground surface into an image.

Non Patent Literature (NPL) 1 describes SAR interferometry that is a technology in which microwave radar observation by an artificial satellite or other flying object is performed on a same position on the ground surface at least twice at different times, and a difference in phase of the reflected waves is taken to analyze landslide. NPL 1 further describes a technology called 2.5-dimensional analysis (2.5-dimensional displacement analysis) which is a kind of three-dimensional analysis. NPL 2 also describes the 2.5-dimensional analysis in detail. It should be noted that the 2.5-dimensional analysis differs from the three-dimensional analysis in a strict sense.

In the 2.5-dimensional analysis, time-series observation data from two different directions are used to calculate a displacement speed of the ground surface. The displacement speed represents an amount of landslide (displacement magnitude) of the ground surface during the observation period. Examples of the displacement of the ground surface include ground uplift and subsidence, and inclination and deformation of structures such as roads and buildings.

Further, in the 2.5-dimensional analysis, the analysis results in two directions of ascending orbit and descending orbit of the flying object are synthesized, and the displacement speed is separated into components of quasi east-west and quasi up-down directions. This technology is able to obtain, for each of the positions (distributed two-dimensionally) on the ground surface, the displacement (two-dimensional components) on the plane in line-of-sight direction (observation direction) of the flying object. Thus, it is called the 2.5-dimensional analysis.

CITATION LIST

Non Patent Literatures

NPL 1: Masayuki Yamanaka et al., "Detection of ground subsidence by InSAR time series analysis", Journal of the Geospatial Information Authority of Japan, No. 124, 2013

NPL 2: Satoshi Fujiwara et al., "2.5-D surface deformation of M6.1 earthquake near Mt Iwate detected by SAR interferometry", Geophysical Research Letters, Vol. 27, No. 14, pp. 2049-2052, Jul. 15, 2000

NPL 3: Alessandro Ferretti et al., "Permanent scatterers in SAR interferometry", IEEE Transactions on Geoscience and Remote Sensing, 39(1), pp. 8-20, 2001

NPL 4: T. Tanaka et al., "Persistent Scatterer Clustering for Structure Displacement Analysis Based on Phase Correlation Network", IEEE IGARSS 2017, pp. 4618-4621, 2017

SUMMARY OF INVENTION

Technical Problem

In the 2.5-dimensional analysis, displacement speeds obtained when observing an object from two different directions are vector synthesized. A synthetic aperture radar signal processing device is presumably configured as illustrated in FIG. 17.

The signal processing device shown in FIG. 17 includes a displacement analysis unit 301, an interpolation processing unit 302, a displacement speed calculation unit 304, and a 2.5-dimensional displacement analysis unit 305.

The displacement analysis unit 301 obtains displacement speeds for every reflection point from observation data in each observation direction. The interpolation processing unit 302 arranges, at equal distances, the reflection points appearing in different positions in the observation images for the respective observation directions. The displacement speed calculation unit 304 acquires a displacement speed of each reflection point after the interpolation. The 2.5-dimensional displacement analysis unit 305 performs 2.5-dimensional analysis for the displacement speeds of the individual reflection points in the respective directions. The displacement analysis unit 301 receives a plurality of data items, or, time-series observation data.

FIG. 18 is a flowchart illustrating an operation of the signal processing device shown in FIG. 17.

As shown in FIG. 18, the displacement analysis unit 301 performs time-series displacement analysis for each observation direction, using time-series observation data in the individual observation directions as input data (step S301). As the method for displacement analysis, a technique called persistent scatterer interferometry (PSI) as described in NPL 3, for example, is utilized. PSI is a technique of extracting persistent scatterers and performing displacement analysis on the points.

The persistent scatterer is a point (scatterer) which coherence does not decrease and from which stable signals are reflected over a long period (at least during the observation period). The persistent scatterer may be defined as a point which reflection intensity is stable (i.e. from which radio waves of intensity not lower than a predetermined level are reflected) over a long period. Further, the persistent scatterer may be defined as a point which phase is stable over a long period. Furthermore, the persistent scatterer may be defined as a point which backscatter characteristic remains unchanged (including the case where it changes to an allowable extent) over a long period.

The interpolation processing unit 302 performs interpolation in which persistent scatterers appearing in different pixels in the individual observation directions are arranged on an equally-spaced grid (step S302). The displacement speed calculation unit 304 calculates a displacement speed of each persistent scatterer after the interpolation (step S304). The 2.5-dimensional displacement analysis unit 305 then performs 2.5-dimensional analysis for the displacement speeds of the persistent scatterers located in the same position in the individual observation directions (step S305).

The signal processing device as shown in FIG. 17 performs the 2.5-dimensional analysis in the above-described manner.

The pixels on which persistent scatterers appear, obtained by time-series displacement analysis, differ in individual directions. Thus, the signal processing device performs associating the pixels considered to be in the same position or in the vicinity in the respective observation dictions, and then performs 2.5-dimensional analysis for each of the corresponding persistent scatterers. In the case of using such an analysis technique, it is difficult to perform displacement analysis to a wide analysis target such as a building. This is because, when performing the displacement analysis, correspondence of a persistent scatterer extracted from the time-series observation data in a respective observation direction to the analysis target (that is the persistent scatterer corresponds to the analysis target; hereinafter, such a point may be referred to as observation targeted persistent scatterer) should be found before associating the observation targeted persistent scatterer in a certain observation direction with the observation targeted persistent scatterer in another observation direction.

Further, an analysis result of the signal processing device as shown in FIG. 17 may include an error when the observation target (analysis target) is set to a location where the density of persistent scatterers is low or a location where there are persistent scatterers indicating displacements different from those of the surroundings.

An object of the present invention is to enhance the reliability of an analysis result when performing displacement analysis (synthetic displacement analysis) by combining displacement analysis results based on a plurality of pieces of observation data from different directions.

Solution to Problem

A synthetic aperture radar signal processing device according to the present invention includes: a persistent scatterer extraction unit configured to extract, from time-series observation data related to an observation target observed from a plurality of observation directions by a radar, a plurality of persistent scatterers in respective observation directions; a persistent scatterer grouping unit configured to group the plurality of persistent scatterers in each of the observation directions; a group selection unit configured to select, in each of the observation directions, a persistent scatterer group that includes the persistent scatterers included in an analysis target from among groups generated by grouping; and a displacement speed processing unit configured to synthesize displacement speeds of the selected persistent scatterer groups.

A synthetic aperture radar signal processing method according to the present invention includes: extracting, from time-series observation data related to an observation target observed from a plurality of observation directions by a radar, a plurality of persistent scatterers in respective observation directions; grouping the plurality of persistent scatterers in each of the observation directions; selecting, in each of the observation directions, a persistent scatterer group that includes the persistent scatterer belonging to an analysis target from among groups generated by the grouping; and synthesizing displacement speeds of the selected persistent scatterer groups.

A synthetic aperture radar signal processing program according to the present invention causes a computer to perform: extracting, from time-series observation data related to an observation target observed from a plurality of observation directions by a radar, a plurality of persistent scatterers in respective observation directions; grouping the plurality of persistent scatterers in each of the observation directions; selecting, in each of the observation directions, a persistent scatterer group that includes the persistent scatterer belonging to an analysis target from among groups generated by the grouping; and synthesizing displacement speeds of the selected persistent scatterer groups.

Advantageous Effects of Invention

According to the present invention, it becomes to be possible to enhance the reliability of the analysis result when performing displacement analysis by combining displacement analysis results based on a plurality of pieces of observation data from different directions.

DESCRIPTION OF EMBODIMENTS

Exemplary embodiments of the present invention will be described below with reference to the drawings.

Exemplary Embodiment 1

Figure 1:
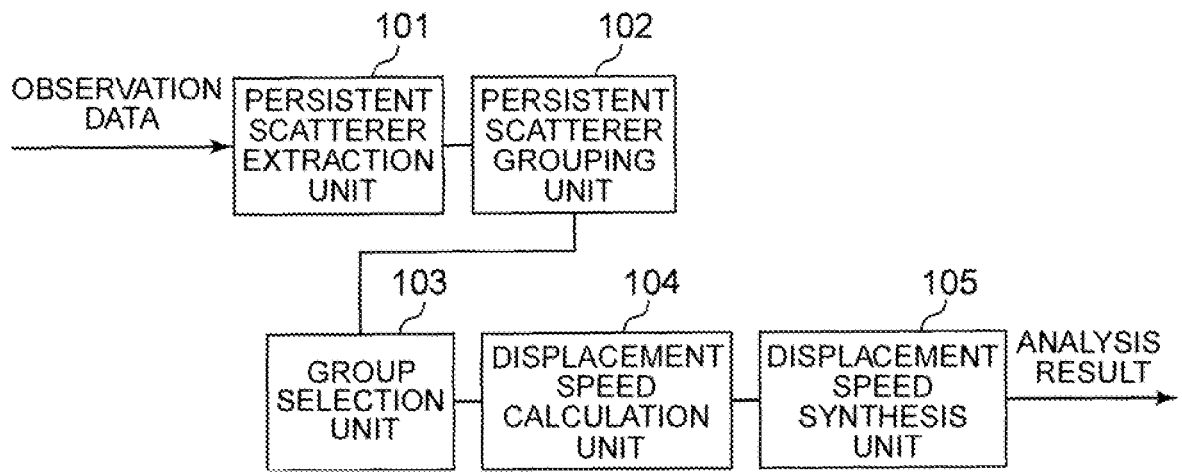
FIG. 1 is a block diagram showing an exemplary configuration of a first exemplary embodiment of the synthetic aperture radar signal processing device.

FIG. 1 is a block diagram showing an exemplary configuration of a first exemplary embodiment of the synthetic aperture radar signal processing device. The signal processing device of the first exemplary embodiment includes a persistent scatterer extraction unit 101, a persistent scatterer grouping unit 102, a group selection unit 103, a displacement speed calculation unit 104, and a displacement speed synthesis unit 105. The persistent scatterer extraction unit 101, the persistent scatterer grouping unit 102, the group selection unit 103, the displacement speed calculation unit 104, and the displacement speed synthesis unit 105 are connected each other. They can communicate with each other (be able to transmit and receive data).

The persistent scatterer extraction unit 101 inputs time-series observation data (time-series observation data in each observation direction) observed by a radar (not shown) from a plurality of directions. The persistent scatterer extraction unit 101 extracts, from the respective observation data, pixels providing persistent scatterers usable for displacement analysis. Generally, two or more persistent scatterers are extracted. Hereinafter, a pixel providing a persistent scatterer will be expressed as "persistent scatterer". For extracting the persistent scatterers, the persistent scatterer extraction unit 101 uses PSI described above, for example. The persistent scatterer extraction unit 101 inputs time-series observation data from two or more directions as the time-series observation data in each observation direction.

The persistent scatterer grouping unit 102 groups, for each observation direction, a plurality of persistent scatterers on the basis of features of the persistent scatterers. Grouping the persistent scatterers means to assign each of the persistent scatterers to any of the groups. In the grouping, the persistent scatterer grouping unit 102 separates a plurality of persistent scatterers into, for example, groups having substantially the same sizes, or groups that correspond to structures from which they reflect. A displacement speed of the persistent scatterer can be utilized as the feature.

The expression "performing processing for each observation direction" means to perform processing on the time-series observation data in a certain observation direction and also perform processing on the time-series observation data in one or more other observation directions.

The group selection unit 103 selects, for each observation direction, a group from among the one or more groups that includes the persistent scatterer from an analysis target (for example, a group enclosing the persistent scatterer from the analysis target). The group selection unit 103 may select a group that includes the persistent scatterers around the analysis target. The group selection unit 103 may select two or more groups. In general, the object to be analyzed has been specified in advance. In other words, in the present exemplary embodiment, the analysis is performed for the object specified in advance.

The displacement speed calculation unit 104 calculates displacement speeds of the groups selected for the respective observation directions. The displacement speeds obtained by the displacement speed calculation unit 104 are regarded as the displacement speeds of the analysis target in respective observation directions.

When calculating the displacement speed of a group, the displacement speed calculation unit 104 can utilize the displacement speed of the persistent scatterer close to the analysis target in the selected group, for example. Further, the displacement speed calculation unit 104 may use a statistic such as a mean or median of the displacement speeds of the persistent scatterers in the selected group, as the displacement speed of the group.

The displacement speed synthesis unit 105 uses the technique described in NPL 2, for example, to synthesize the displacement speeds of the analysis target in the respective observation directions. When observation data from two directions are utilized, the displacement speeds are synthesized on a plane formed by the vectors of the respective observation directions. Thereafter, 2.5-dimensional analysis is performed for the analysis target, so that the displacement speed is separated into components of quasi east-west and quasi up-down directions. When observation data in three or more different line-of-sight directions are utilized, three-dimensional analysis of the analysis target is realized. When observation data in four or more directions are utilized, the displacement speed synthesis unit 105 may utilize the least-square method or the like to calculate a synthesized displacement speed that ensures highest consistency.

Figure 2:
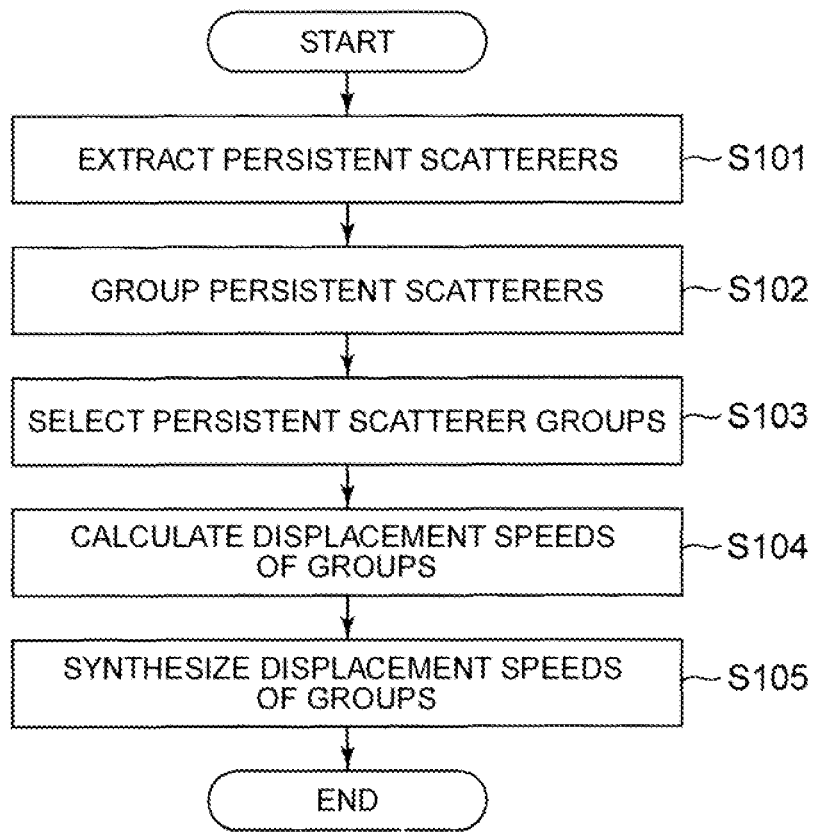
FIG. 2 is a flowchart illustrating an operation of the first exemplary embodiment.

An operation of the first exemplary embodiment of the synthetic aperture radar signal processing device will now be described. FIG. 2 is a flowchart illustrating the operation of the first exemplary embodiment.

The persistent scatterer extraction unit 101 inputs time-series data in each observation direction by the synthetic aperture radar. As shown in FIG. 2, the persistent scatterer extraction unit 101 extracts persistent scatterers for each observation direction (step S101).

The persistent scatterer grouping unit 102 groups the plurality of persistent scatterers into a plurality of groups (step S102). The persistent scatterer grouping unit 102 performs the grouping by using a displacement speed of each persistent scatterer as a feature, for example.

The group selection unit 103 selects one or more persistent scatterer groups from the plurality of groups (step S103). For example, the persistent scatterer group is a group that includes a persistent scatterer closest to the analysis target (including a persistent scatterer on the analysis target). When there is a group including persistent scatterers enclosing the analysis target, the group may be selected as the persistent scatterer group.

Further, the group selection unit 103 may display persistent scatterers on a display so that persistent scatterers in each group are displayed in a different color from colors of persistent scatterers in other groups. In this case, when a user designates one group, the group selection unit 103 sets the designated group as the persistent scatterer group.

The displacement speed calculation unit 104 calculates, for each observation direction, a displacement speed of the group selected as the persistent scatterer group (step S104). For example, the displacement speed calculation unit 104 can utilize the displacement speed of the point close to the analysis target in the selected group. The displacement speed calculation unit 104 may utilize a statistic such as a mean or median of the displacement speeds of the persistent scatterers constituting the selected group, so as to calculate the displacement speed of the group.

The displacement speed synthesis unit 105 synthesizes the displacement speeds of the persistent scatterer groups in the respective observation directions, and outputs the result of synthesis (step S105).

In the present exemplary embodiment, the obtained persistent scatterers are grouped for each observation direction. Then, synthetic displacement analysis is performed on the groups corresponding to the analysis target. Thus, when the persistent scatterers are obtained in different positions in the respective observation directions, synthetic displacement analysis can be performed by regarding each group as one large persistent scatterer. This makes it possible to carry out synthetic displacement analysis to an analysis target, without corresponding persistent scatterers each other.

Figure 3:
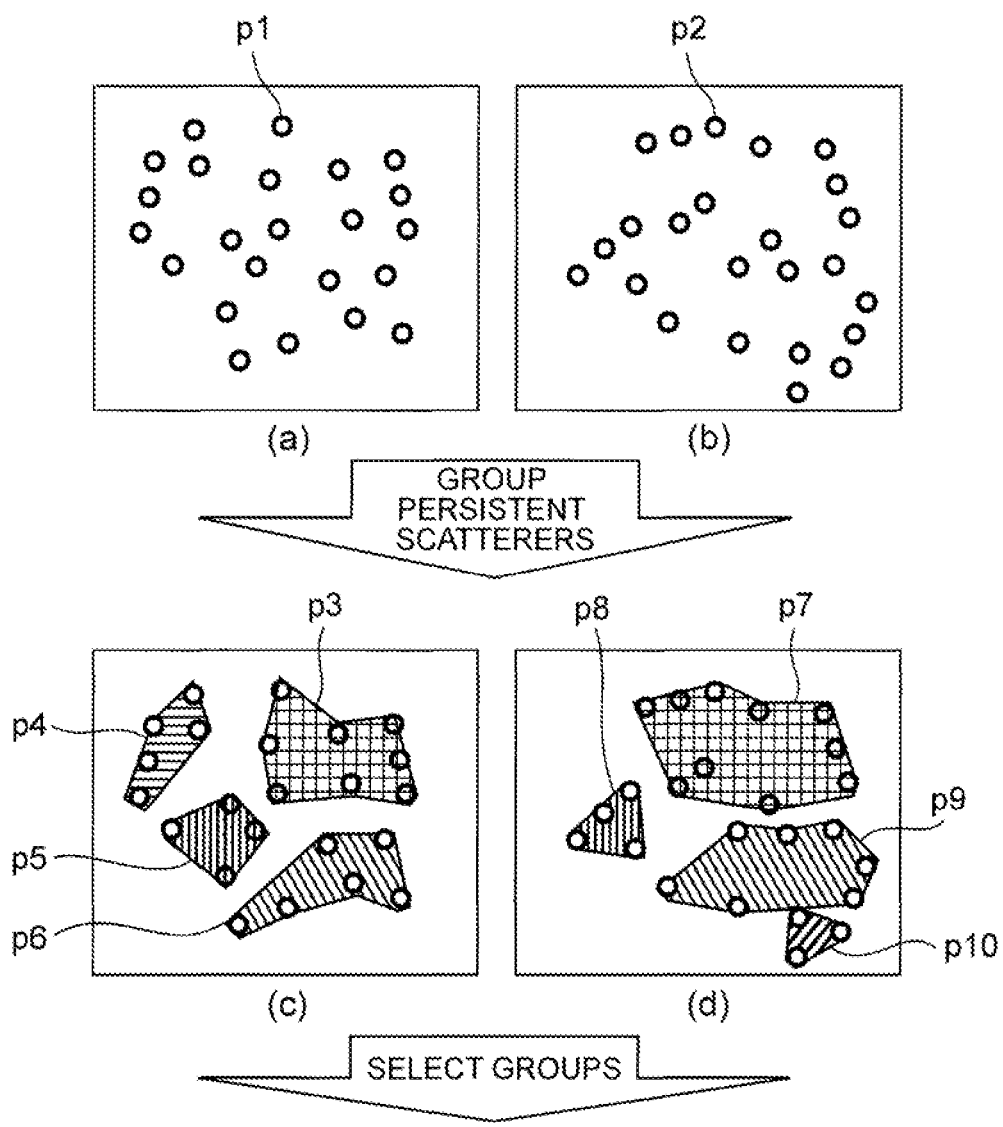
FIG. 3 is a diagram illustrating advantageous effects of the first exemplary embodiment.

FIG. 3 is a diagram illustrating advantageous effects of the present exemplary embodiment. Referring to (a) and (b) in FIG. 3 illustrate images of persistent scatterers obtained when observing the same region from different directions. In (a) and (b) in FIG. 3, p1 and p2 denote persistent scatterers. While the reference signs p1 and p2 are applied to one position each in (a) and (b) in FIG. 3, all the circles indicate the persistent scatterers.

When a region including an object of analysis (observation) is observed by a synthetic aperture radar from different directions, positions where persistent scatterers are obtained are different as shown in (a) and (b) in FIG. 3. In a general synthetic aperture radar signal processing device, in order to perform synthetic displacement analysis, one-to-one correspondence of persistent scatterers is performed between the persistent scatterers illustrated in (a) in FIG. 3 and the persistent scatterers illustrated in (b) in FIG. 3. In the synthetic aperture radar signal processing device in the present exemplary embodiment, the persistent scatterers are grouped as illustrated in (c) and (d) in FIG. 3. As a result, it becomes possible to perform synthetic displacement analysis by calculating the displacement speed for a region having a wide area, without corresponding persistent scatterers on a one-to-one basis.

It should be noted that in (c) and (d) in FIG., p3 to p10 denote respective groups. Each group is a set of persistent scatterers having similar displacement information.

For example, in the case where the group p3 and the group p7 include reflection points from the analysis target, the groups p3 and p7 are selected by the group selection unit 103. The displacement speed calculation unit 104 calculates the displacement speed by regarding each of the groups p3 and p7 as one persistent scatterer. Thereafter, synthetic displacement analysis is carried out to obtain the synthesized displacement speed of the analysis target.

Exemplary Embodiment 2

Figure 4:
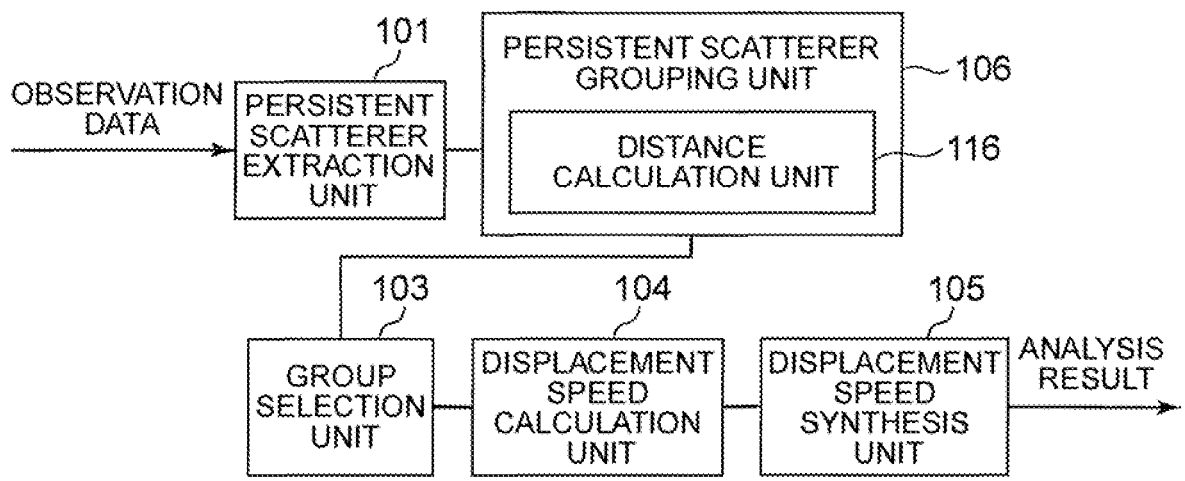
FIG. 4 is a block diagram showing an exemplary configuration of a second exemplary embodiment of the synthetic aperture radar signal processing device.

FIG. 4 is a block diagram showing an exemplary configuration of a second exemplary embodiment of the synthetic aperture radar signal processing device. The signal processing device of the second exemplary embodiment includes a persistent scatterer extraction unit 101, a persistent scatterer grouping unit 106, a group selection unit 103, a displacement speed calculation unit 104, and a displacement speed synthesis unit 105. The persistent scatterer extraction unit 101, the persistent scatterer grouping unit 106, the group selection unit 103, the displacement speed calculation unit 104, and the displacement speed synthesis unit 105 are connected each other. They can communicate with each other (be able to transmit and receive data). The persistent scatterer grouping unit 106 includes a distance calculation unit 116.

The persistent scatterer grouping unit 106 groups such that the sizes of generated groups will be substantially the same. In order to make the groups the same size, the persistent scatterer grouping unit 106 performs the grouping by using a distance (in the present exemplary embodiment, Euclidean distance, for example) between persistent scatterers as a feature, for example. Specifically, the persistent scatterer grouping unit 106 performs the grouping on the basis of positional information (coordinates, for example) of the persistent scatterers, such that the respective groups have substantially the same size.

More specifically, in the persistent scatterer grouping unit 106, the distance calculation unit 116 calculates a Euclidean distance between any two of a plurality of persistent scatterers as a distance between the two persistent scatterers.

The expression "comparable size" means a size that falls within a predetermined range with respect to a size that has been set as a reference size by a user of the signal processing device, for example. The predetermined range is ±30%, for example (specifically, size of 70% to 130% with respect to the reference size). However, the predetermined range is not limited to ±30%. it may be set arbitrarily. For example, a range according to the size (area) of the analysis target may be selected.

Further, for the grouping, the persistent scatterer grouping unit 106 may use hierarchical clustering based on the minimum variance method, using the distances between the respective persistent scatterers as the features, for example. Further, the persistent scatterer grouping unit 106 may use partitional optimization clustering based on the k-means clustering, using the distances between the persistent scatterers as the features. The above are merely examples. The persistent scatterer grouping unit 106 may use another technique for the grouping.

The components other than the persistent scatterer grouping unit 106 are identical to those in the first exemplary embodiment.

Figure 5:
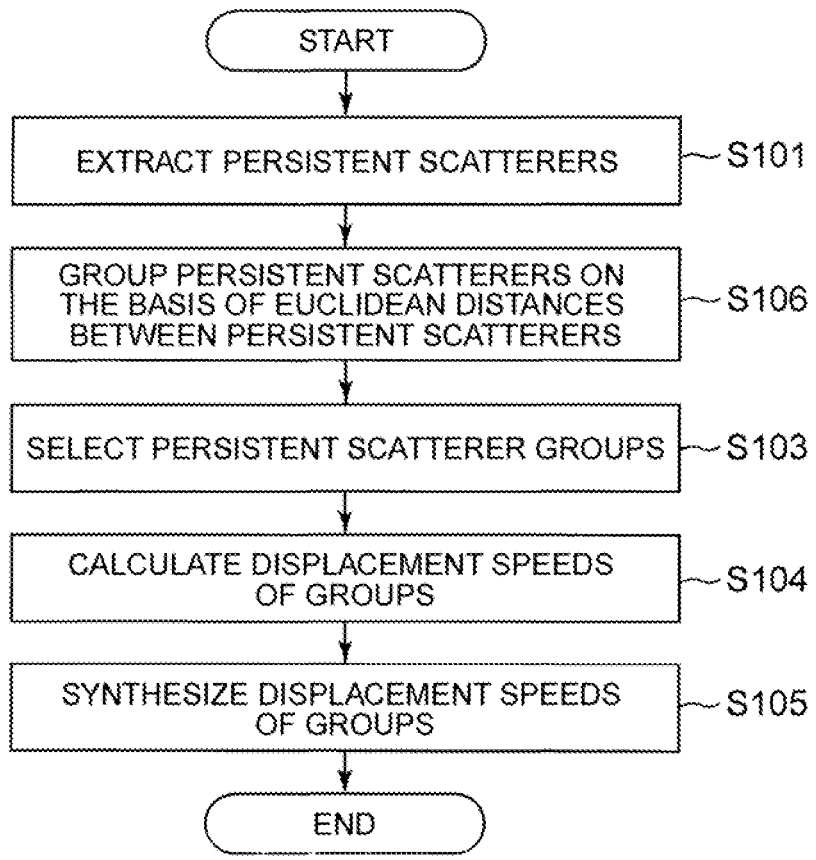
FIG. 5 is a flowchart illustrating an operation of the second exemplary embodiment.

An operation of the second exemplary embodiment of the synthetic aperture radar signal processing device will now be described. FIG. 5 is a flowchart illustrating the operation of the second exemplary embodiment.

The persistent scatterer extraction unit 101 performs processing similar to that in the first exemplary embodiment (step S101).

The persistent scatterer grouping unit 106 inputs the persistent scatterers extracted in the respective observation directions in the processing in step S101. The persistent scatterer grouping unit 106 then groups, in each observation direction, the persistent scatterers on the basis of the distances between the persistent scatterers, such that each generated group has substantially the same size (step S106). For example, the persistent scatterer grouping unit 106 targets a certain persistent scatterer, and performs grouping such that one or more persistent scatterers falling within a predetermined distance from the targeted persistent scatterer and the one or more persistent scatterers belong to the same group as the targeted persistent scatterer. It should be noted that the positional information on the persistent scatterers for obtaining the distances between the persistent scatterers is input together with the observation data, for example.

The other processes are identical to those in the first exemplary embodiment.

In the present exemplary embodiment, the persistent scatterers are grouped, on the basis of the distance information between the persistent scatterers, such that each group has substantially the same size. Regarding a displacement such as ground deformation that affects a wide area, the displacement speed of a respective persistent scatterer tends to be similar to that of the nearby persistent scatterer. Thus, in the present exemplary embodiment, the persistent scatterers having substantially the same displacement speeds for example, are classified into a group. Then, the displacement speeds of the persistent scatterers groups including the analysis target are synthesized in the respective observation directions, thereby synthetic displacement analysis of the analysis target becomes possible. The present exemplary embodiment exhibits effects when analyzing displacement of the ground, for example.

It is assumed that when the distance (in the present exemplary embodiment, Euclidean distance, for example) between two persistent scatterers is small, the two persistent scatterers are likely to be related to the same object. When the distance is large, it is assumed that the two persistent scatterers are unlikely to be related to the same object. Existence of relationship between persistent scatterers and an object means that they are persistent scatterers in one object (building or the like), for example.

Exemplary Embodiment 3

Figure 6:
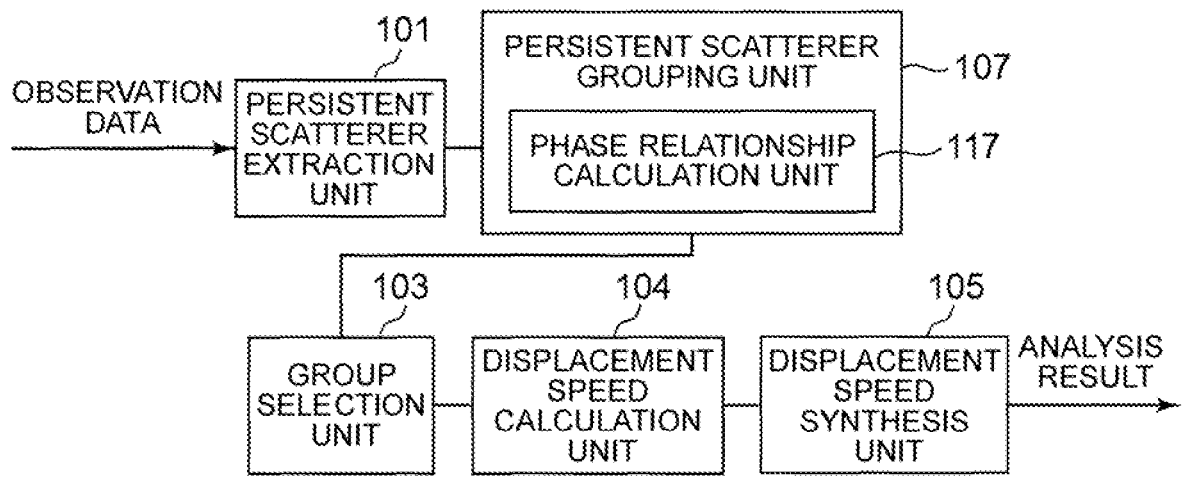
FIG. 6 is a block diagram showing an exemplary configuration of a third exemplary embodiment of the synthetic aperture radar signal processing device.

FIG. 6 is a block diagram showing an exemplary configuration of a third exemplary embodiment of the synthetic aperture radar signal processing device. The signal processing device of the third exemplary embodiment includes a persistent scatterer extraction unit 101, a persistent scatterer grouping unit 107, a group selection unit 103, a displacement speed calculation unit 104, and a displacement speed synthesis unit 105. The persistent scatterer extraction unit 101, the persistent scatterer grouping unit 107, the group selection unit 103, the displacement speed calculation unit 104, and the displacement speed synthesis unit 105 are connected each other. They can communicate with each other (be able to transmit and receive data). The persistent scatterer grouping unit 107 includes a phase relationship calculation unit 117.

The persistent scatterer grouping unit 107 groups the persistent scatterers which sizes are substantially the same. In order to make the groups the same size, in the present exemplary embodiment, the persistent scatterer grouping unit 107 utilizes one of the features of a persistent scatterer that depends on the shape of the structure. In the present exemplary embodiment, the persistent scatterer grouping unit 107 uses a phase of a persistent scatterer as the feature. The phase is merely an example. Another feature may be utilized as the feature that depends on the shape of the structure. Further, the persistent scatterer grouping unit 107 may group the persistent scatterers on the basis of known shapes of structures.

Specifically, in the persistent scatterer grouping unit 107, the phase relationship calculation unit 117 identifies a phase in each of the persistent scatterers. The phase relationship calculation unit 117 then calculates a value that can identify the relation of the phases. For example, the phase relationship calculation unit 117 makes pairs of arbitrary two persistent scatterers for all the persistent scatterers, and calculates a correlation coefficient of the phases of the persistent scatterers for all the pairs.

The persistent scatterer grouping unit 107 targets a certain persistent scatterer, and performs grouping such that one or more persistent scatterers having the phase with a large correlation coefficient value with respect to the phase of the targeted scatterer and the one or more persistent scatterers belong to the same group as the targeted persistent scatterer.

It should be noted that a large correlation coefficient value means a value that exceeds a predetermined threshold value, for example.

Figure 7:
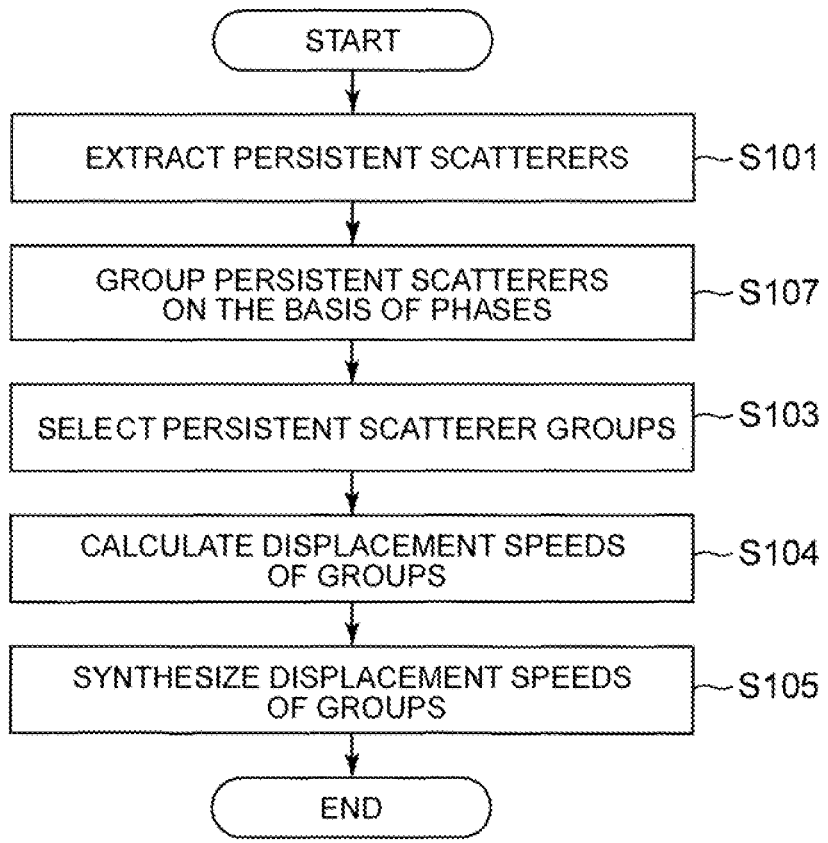
FIG. 7 is a flowchart illustrating an operation of the third exemplary embodiment.

An operation of the third exemplary embodiment of the synthetic aperture radar signal processing device will now be described. FIG. 7 is a flowchart illustrating the operation of the third exemplary embodiment.

The persistent scatterer extraction unit 101 performs processing similar to that in the first exemplary embodiment (step S101).

The persistent scatterer grouping unit 107 inputs the persistent scatterers extracted for each observation data in the processing in step S101. The persistent scatterer grouping unit 107 groups the persistent scatterers by the above-described processing, that is, on the basis of a feature (in the present exemplary embodiment, phase) that depends on the shape of the structure (step S107).

The other processes are identical to those in the first exemplary embodiment.

In the present exemplary embodiment, the persistent scatterer grouping unit 107 performs the grouping on the basis of one of the features of the persistent scatterers that depends on the shapes of the structures within the observation region. Accordingly, the persistent scatterer grouping unit 107 is able to classify the persistent scatterers, among a plurality of persistent scatterers, that correspond to the shape of a structure such as a building or a road into one group. As a result, when the analysis target is a structure, the group selection unit 103 can easily select, in each observation direction, the group that includes the persistent scatterers corresponding to the analysis target. This facilitates processing of performing synthetic displacement analysis targeting only on the structure.

Since only a structure is targeted, the present exemplary embodiment is also applicable to detecting a structure displacing in a different manner from the displacement of the ground.

Figure 8:
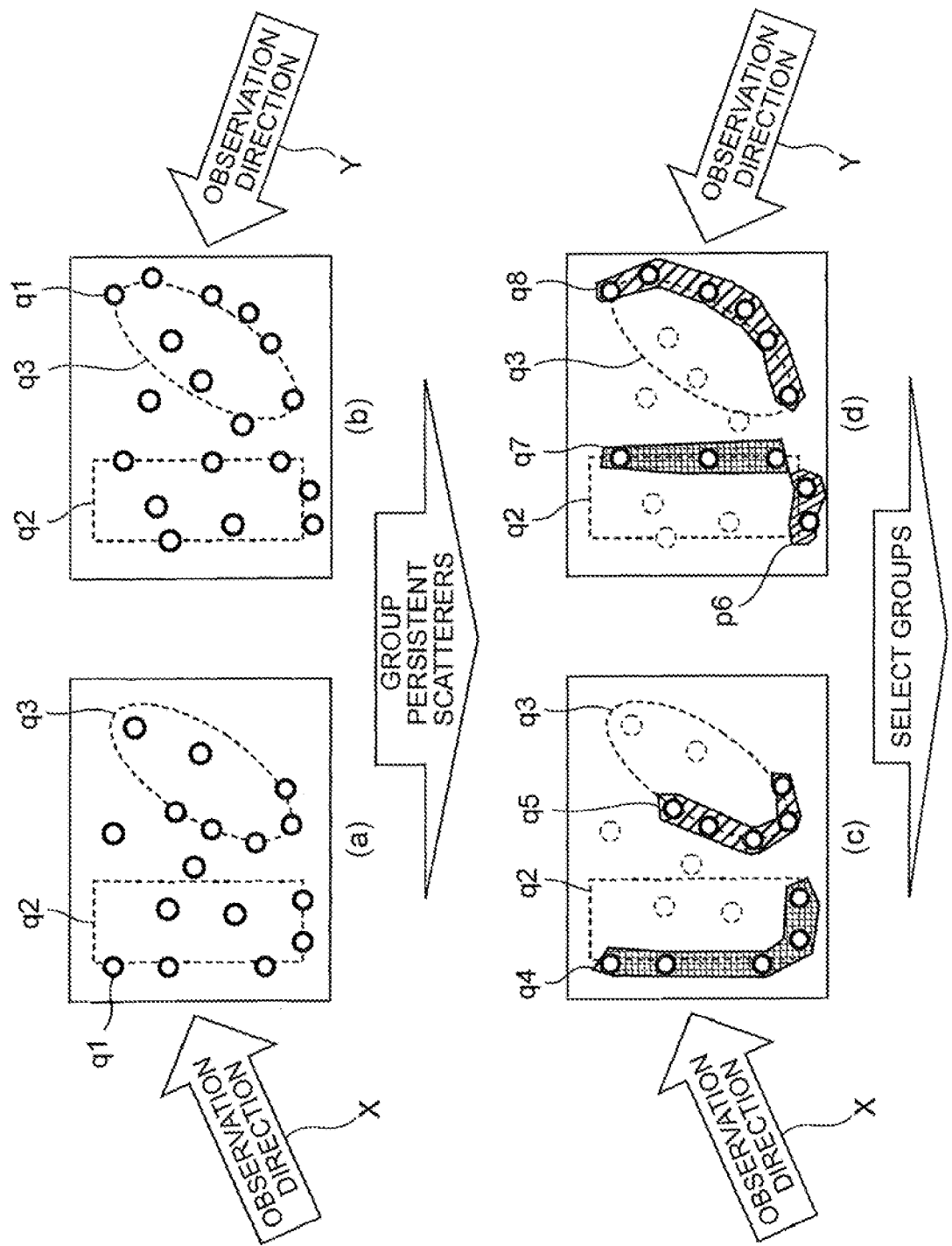
FIG. 8 is a diagram illustrating advantageous effects of the third exemplary embodiment.

FIG. 8 is a diagram illustrating advantageous effects of the present exemplary embodiment. Referring to FIG. 8, (a) and (b) illustrate images of persistent scatterers obtained when observing the same region from different directions. In (a) and (b) in FIG. 8, q1 denotes a persistent scatterer. While the reference sign q1 is applied to one position each in (a) and (b) in FIG. 8, all the circles indicate the persistent scatterers. In (a) and (b) in FIG. 8, q2 and q3 denote structures in the observation region.

The synthetic aperture radar signal processing device of the present exemplary embodiment groups a plurality of persistent scatterers on the basis of a feature (in the present exemplary embodiment, for example, phase) that depends on the shapes of the structures, as illustrated in (c) and (d) in FIG. 8. In (c) in FIG. 8, q4 denotes a group of persistent scatterers on the structure q2 as seen from a certain observation direction X, and q5 denotes a group of persistent scatterers on the structure q3 as seen from the observation direction X. In (d) in FIG. 8, q6 and q7 respectively denote a group of persistent scatterers on the structure q2 as seen from another observation direction Y, and q8 denotes a group of persistent scatterers on the structure q3 as seen from the observation direction Y.

For example, when the structure q3 is the analysis target, the group selection unit 103 selects the group q5 in the observation direction X and the group q8 in the observation direction Y as the persistent scatterer groups for the analysis target. The displacement speed calculation unit 104 calculates a displacement speed for each group, i.e. for the group q5 and the group q8, and combines the displacement speeds to obtain a synthesized displacement speed. In this manner, the present exemplary embodiment is able to perform the synthetic displacement analysis targeting only the structure.

It should be noted that, in the case where the phase correlation is also regarded as a distance, since the similarity in phase is high when the distance between two persistent scatterers (in the present exemplary embodiment, for example, the phase correlation coefficient) is large, it is assumed that the two persistent scatterers are likely to be related to the same object. Further, when the distance between two persistent scatterers is small, it is assumed that the two persistent scatterers are unlikely to be related to the same object.

Exemplary Embodiment 4

Figure 9:
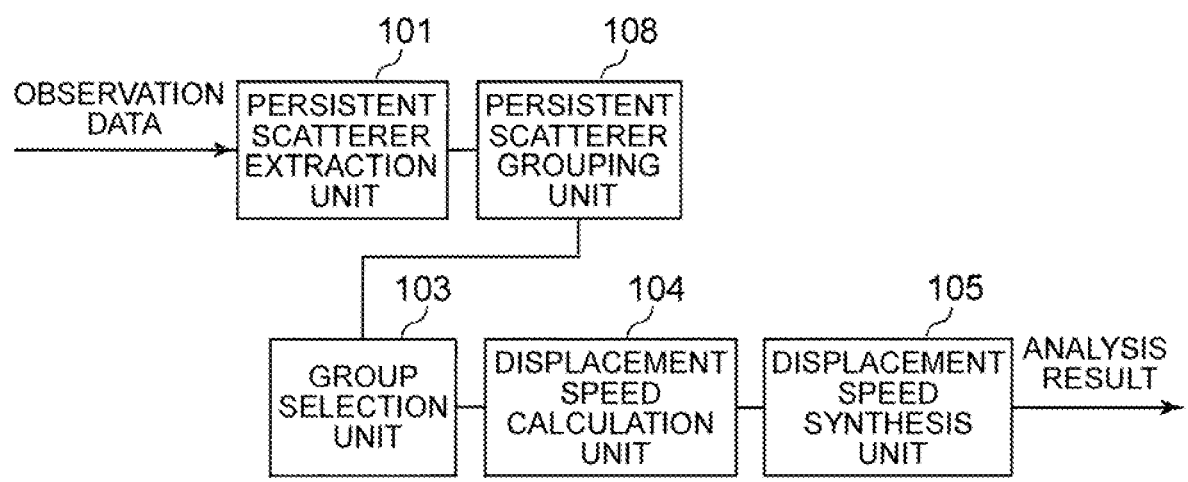
FIG. 9 is a block diagram showing an exemplary configuration of a fourth exemplary embodiment of the synthetic aperture radar signal processing device.

FIG. 9 is a block diagram showing an exemplary configuration of a fourth exemplary embodiment of the synthetic aperture radar signal processing device. The signal processing device of the fourth exemplary embodiment includes a persistent scatterer extraction unit 101, a persistent scatterer grouping unit 108, a group selection unit 103, a displacement speed calculation unit 104, and a displacement speed synthesis unit 105. The persistent scatterer extraction unit 101, the persistent scatterer grouping unit 108, the group selection unit 103, the displacement speed calculation unit 104, and the displacement speed synthesis unit 105 are connected each other. They can communicate with each other (be able to transmit and receive data).

In the present exemplary embodiment, the persistent scatterer grouping unit 108 groups the persistent scatterers such that the generated groups are of comparable size and that the shapes of structures appear in the sets of persistent scatterers. That is to say, the present exemplary embodiment corresponds to a combination of the second and third exemplary embodiments.

Figure 10:
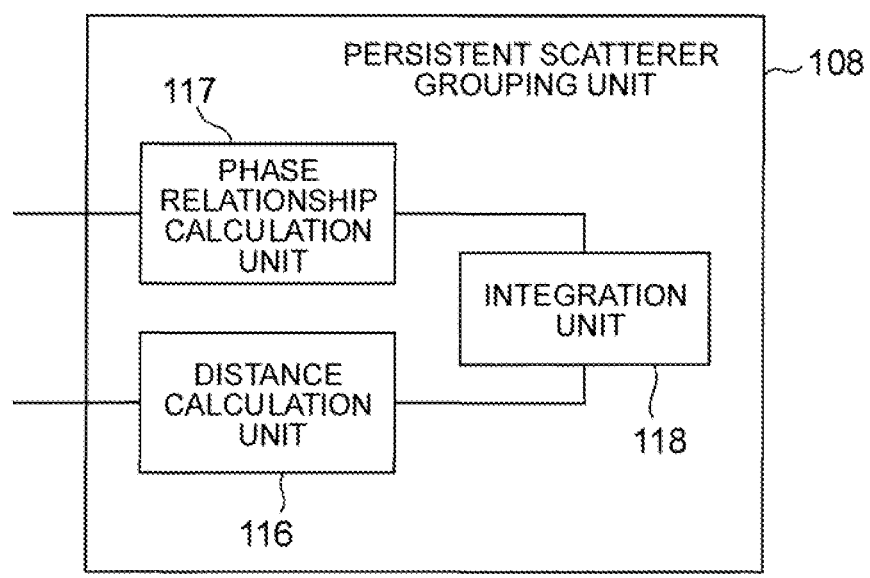
FIG. 10 is a block diagram showing an exemplary configuration of a persistent scatterer grouping unit in the fourth exemplary embodiment.

FIG. 10 is a block diagram showing an exemplary configuration of the persistent scatterer grouping unit 108. As shown in FIG. 10, the persistent scatterer grouping unit 108 includes a distance calculation unit 116, a phase relationship calculation unit 117, and an integration unit 118.

The distance calculation unit 116 calculates a Euclidean distance between any two persistent scatterers among a plurality of persistent scatterers as the distance between the two persistent scatterers, as in the case of the second exemplary embodiment. The phase relationship calculation unit 117 calculates a value that can identify the relation of the phases, as in the case of the third exemplary embodiment. For example, the phase relationship calculation unit 117, makes pairs of arbitrary two persistent scatterers for all the persistent scatterers, and calculates a correlation coefficient of the phases of the persistent scatterers for all the pairs.

The integration unit 118 inputs from the distance calculation unit 116 the Euclidean distances between the persistent scatterers. The integration unit 118 also inputs from the phase relationship calculation unit 117 the correlation coefficients as an example of the value that can identify the relation of the phases. The integration unit 118 then calculates a "distance" on which both the Euclidean distance and the phase correlation coefficient are reflected. The calculation method below is described in NPL 4 as well.

As explained above, when the Euclidean distance is small, it is assumed that the two persistent scatterers are likely to be related to the same object. On the other hand, when the phase correlation coefficient is large, it is assumed that the two persistent scatterers are likely to be related to the same object.

Thus, before integrating the Euclidean distance and the correlation coefficient, that is, before calculating the "distance" reflecting both the Euclidean distance and the phase correlation coefficient, the integration unit 118 performs conversion of the phase correlation coefficient such that the smaller value indicates the higher possibility of being related to the object. The integration unit 118 may perform conversion of the Euclidean distance value such that the greater value indicates the higher possibility of being related to the object.

Specifically, the integration unit 118 calculates a "distance" $d_{m,n}$ using the expression (1), for example, where $l_{m,n}$ represents a Euclidean distance between a persistent scatterer m and a persistent scatterer n, and $c_{m,n}$ represents a value of the correlation coefficient between the phase of the persistent scatterer m and the phase of the persistent scatterer n.

$$d_{m,n} = (1 - c_{m,n}) l_{m,n} \tag{1}$$

The integration unit 118 may calculate the "distance" $d_{m,n}$ using the expression (2). The constant γ is a predetermined real number greater than 0.

$$d_{m,n} = (c_{m,n}^{-\gamma} - 1) l_{m,n} \tag{2}$$

When the integration unit 118 uses the expression (2), $d_{m,n}$ diverges to infinity as $c_{m,n}$ approaches 0. That is to say, when the correlation between two persistent scatterers is low, $d_{m,n}$ becomes extremely large. This leads to a smaller possibility that the two persistent scatterers having a low correlation belong to one group. It should be noted that the value of $c_{m,n}$ is assumed to be within the range of 0 to 1.

Although the expression (1) or (2) is used in the present exemplary embodiment, $(c_{m,n}^{-\gamma} - 1)$ in the expression (2) may be used as the feature in the third exemplary embodiment. In such a case, the persistent scatterer grouping unit 107 determines that as the feature is greater, the correlation between the two persistent scatterers is lower.

Figure 11:
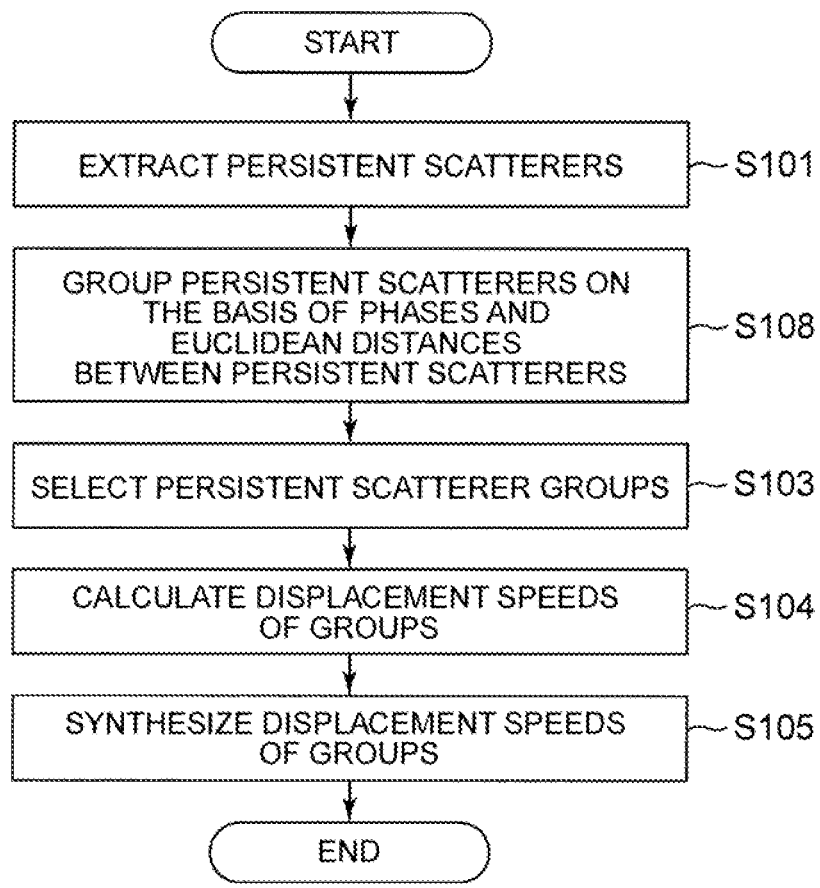
FIG. 11 is a flowchart illustrating an operation of the fourth exemplary embodiment.

An operation of the fourth exemplary embodiment of the synthetic aperture radar signal processing device will now be described. FIG. 11 is a flowchart illustrating the operation of the fourth exemplary embodiment.

The persistent scatterer extraction unit 101 performs processing similar to that in the first exemplary embodiment (step S101).

The persistent scatterer grouping unit 108 inputs the persistent scatterers extracted for each observation data in the processing in step S101. The persistent scatterer grouping unit 108 groups the persistent scatterers by the above-described processing, such that the sizes of generated groups will be substantially the same and the persistent scatterers are brought together along the shapes of the structures (step S108). Specifically, in the present exemplary embodiment, the persistent scatterer grouping unit 108 performs the grouping as the "distance" on which both the Euclidean distance and the phase correlation coefficient are reflected is regarded as the feature.

The other processes are identical to those in the first exemplary embodiment.

Generally, the structures such as buildings existent in the observation region are not uniform in size. In the present exemplary embodiment, the persistent scatterer grouping unit 108 performs the grouping such that each group has substantially the same size and that the shapes of the structures appear in the sets of persistent scatterers. Accordingly, the signal processing device of the present exemplary embodiment is able to perform the synthetic displacement analysis targeting the structure which size is suitable to the size of the analysis target.

Exemplary Embodiment 5

Figure 12:
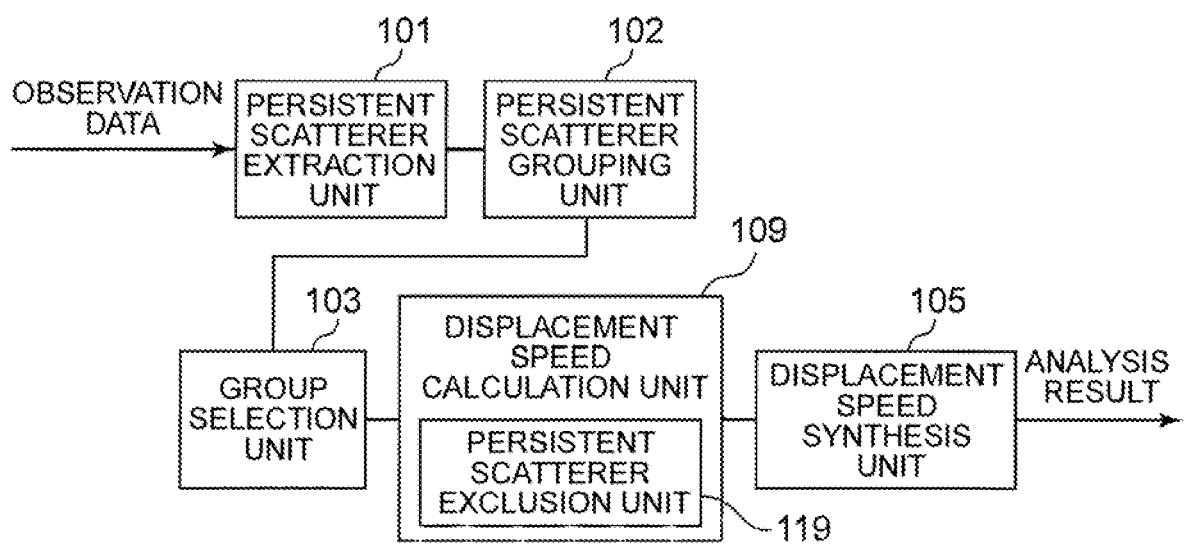
FIG. 12 is a block diagram showing an exemplary configuration of a fifth exemplary embodiment of the synthetic aperture radar signal processing device.

FIG. 12 is a block diagram showing an exemplary configuration of a fifth exemplary embodiment of the synthetic aperture radar signal processing device. The signal processing device of the fifth exemplary embodiment includes a persistent scatterer extraction unit 101, a persistent scatterer grouping unit 102, a group selection unit 103, a displacement speed calculation unit 109, and a displacement speed synthesis unit 105. The persistent scatterer extraction unit 101, the persistent scatterer grouping unit 102, the group selection unit 103, the displacement speed calculation unit 109, and the displacement speed synthesis unit 105 are connected each other. They can communicate with each other (be able to transmit and receive data).

In the present exemplary embodiment, the displacement speed calculation unit 109 excludes certain persistent scatterers from a group. The displacement speed calculation unit 109 includes a persistent scatterer exclusion unit 119. The persistent scatterer exclusion unit 119 excludes, from the persistent scatterers belonging to the selected persistent scatterer group, any persistent scatterer having a largely different displacement speed as an outlier. For example, the persistent scatterer exclusion unit 119 excludes any persistent scatterer that has a displacement speed far apart from the central displacement speed in the group. Here, the "largely different displacement speed" refers to a displacement speed that exceeds a predetermined threshold value with respect to another displacement speed. The displacement speed that exceeds a predetermined threshold value is a displacement speed that falls outside the range of ±20% from another displacement speed, for example.

The displacement speed calculation unit 109 utilizes only the persistent scatterers having a displacement speed close to the mean value of the displacement speeds of the persistent scatterers included in the group selected by the group selection unit 103, for example. For example, the persistent scatterer exclusion unit 119 calculates a mean and a standard deviation of the persistent scatterers included in the group, then the persistent scatterer exclusion unit 119 then extracts persistent scatterers having displacement speeds whose differences from the mean value are within the standard deviation. The displacement speed calculation unit 109 uses the extracted persistent scatterers to calculate the displacement speed of the group. Accordingly, any persistent scatterer having a displacement speed far apart from the mean value is excluded by the persistent scatterer exclusion unit 119.

The displacement speed far apart from the central displacement speed in the group (in the present exemplary embodiment, the displacement speed whose difference from the mean value exceeds the standard deviation) is a displacement speed that falls within a predetermined range (by way of example, ±10%) with respect to the central displacement speed.

The other processes are identical to those in the first exemplary embodiment. It should be noted that the above method of excluding the persistent scatterers is merely an example. The persistent scatterer exclusion unit 119 may use another method to exclude any persistent scatterer that has a displacement speed far apart from the central displacement speed.

Figure 13:
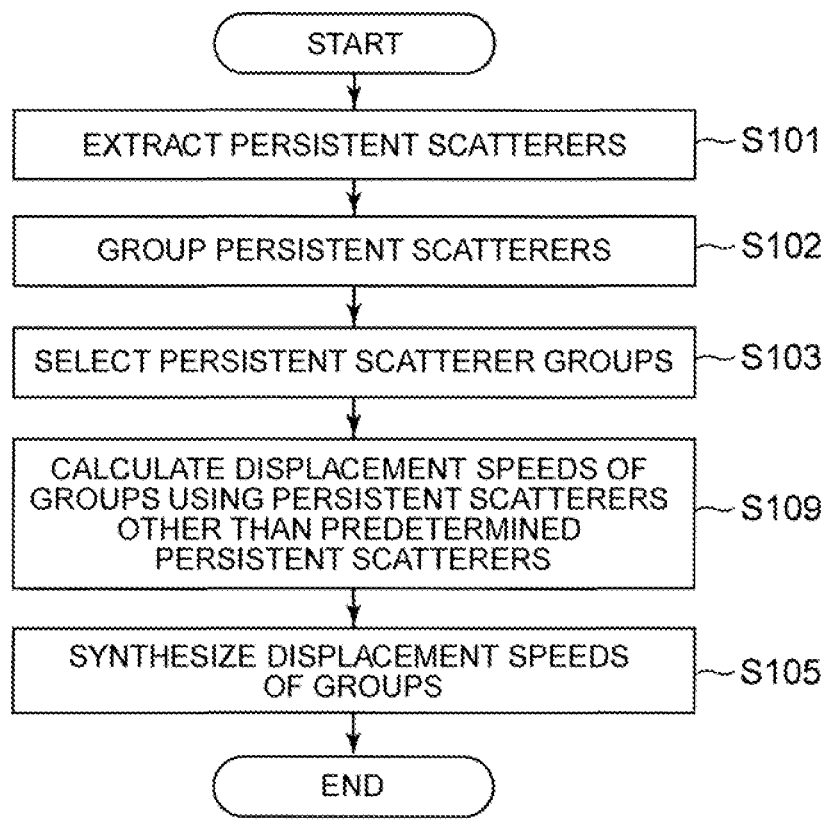
FIG. 13 is a flowchart illustrating an operation of the fifth exemplary embodiment.

An operation of the fifth exemplary embodiment of the synthetic aperture radar signal processing device will now be described. FIG. 13 is a flowchart illustrating the operation of the fifth exemplary embodiment.

The persistent scatterer extraction unit 101, the persistent scatterer grouping unit 102, and the group selection unit 103 perform processing similar to those in the first exemplary embodiment (steps S101 to S103).

The displacement speed calculation unit 109 calculates the displacement speed of the group by the processing as described above (step S109). That is to say, the unit calculates the displacement speed of the group by using the displacement speeds of the persistent scatterers in the set of persistent scatterers with certain persistent scatterers excluded therefrom.

In the present exemplary embodiment, the displacement speed calculation unit 109 excludes any persistent scatterer having a largely different displacement speed as an outlier before calculating the displacement speed of the group. For example, the displacement speed calculation unit 109 calculates the displacement speed of the group by using the persistent scatterers, included in the selected group, having a displacement speed close to the central displacement speed (in the present exemplary embodiment, for example, mean value). Thus, even if a persistent scatterer having a displacement speed largely different from those of the neighboring persistent scatterers is erroneously included in a group in the grouping processing, such a persistent scatterer is excluded as an outlier. Accordingly, the displacement speed of the group selected in each observation direction can be calculated more accurately. That is to say, the synthesized displacement speed is also improved in precision. As a result, higher-precision displacement analysis by synthetic aperture radar is carried out.

While the present exemplary embodiment has been combined with the first exemplary embodiment, the present exemplary embodiment can also be combined with any of the second through fifth exemplary embodiments.

As described above, the signal processing devices of the above exemplary embodiments are capable of performing the displacement analysis focusing only on the analysis target. This is because, since the persistent scatterers are grouped in units of lands or structures in the observation region, reliable synthetic displacement analysis utilizing the persistent scatterers from the analysis target can be realized.

Further, the signal processing devices of the above exemplary embodiments are capable of performing high-precision synthetic displacement analysis. This is because, since the persistent scatterers are grouped in units of lands or structures in the observation region, synthetic displacement analysis can be performed by excluding the persistent scatterers other than those in the analysis target.

Although the components in the above exemplary embodiments may be configured with a piece of hardware or a piece of software. Alternatively, the components may be configured with a plurality of pieces of hardware or a plurality of pieces of software. Further, part of the components may be configured with hardware and the other part with software.

The functions (processes) in the above exemplary embodiments may be realized by a computer having a processor such as a central processing unit (CPU), a memory, etc. For example, a program for performing the method (processing) in the above exemplary embodiments may be stored in a storage device (storage medium), and the functions may be realized with the CPU executing the program stored in the storage device.

Figure 14:
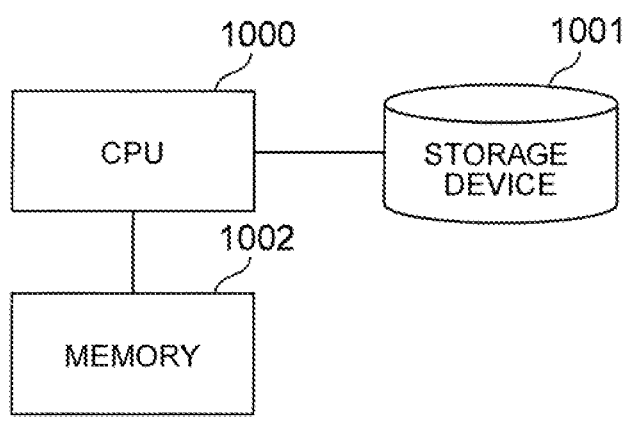
FIG. 14 is a block diagram showing an example of a computer having a CPU.

FIG. 14 is a block diagram showing an example of the computer having a CPU. The computer is mounted on the synthetic aperture radar signal processing device. The CPU 1000 executes processing in accordance with a program stored in a storage device 1001 to realize the functions in the above exemplary embodiments. That is to say, the functions of the persistent scatterer extraction unit 101, the persistent scatterer grouping units 102, 106, 107, 108, the group selection unit 103, the displacement speed calculation units 104, 109, and the displacement speed synthesis unit 105 in the signal processing devices shown in FIGS. 1, 4, 6, 9, and 12 are realized.

The storage device 1001 is, for example, a non-transitory computer readable medium. The non-transitory computer readable medium includes various types of tangible storage media. Specific examples of the non-transitory computer readable medium include magnetic storage media (for example, flexible disk, magnetic tape, hard disk drive), magneto-optical storage media (for example, magneto-optical disc), compact disc-read only memory (CD-ROM), compact disc-recordable (CD-R), compact disc-rewritable (CD-R/W), and semiconductor memories (for example, mask ROM, programmable ROM (PROM), erasable PROM (EPROM), flash ROM).

The program may be stored in various types of transitory computer readable media. The transitory computer readable medium is supplied with the program via, for example, a wired or wireless communication channel, or, via electric signals, optical signals, or electromagnetic waves.

A memory 1002 is a storage means implemented by a random access memory (RAM), for example, and temporarily stores data when the CPU 1000 executes processing. A conceivable mode is that the program held in the storage device 1001 or in a transitory computer readable medium is transferred to the memory 1002, and the CPU 1000 executes processing on the basis of the program in the memory 1002.

Figure 15:
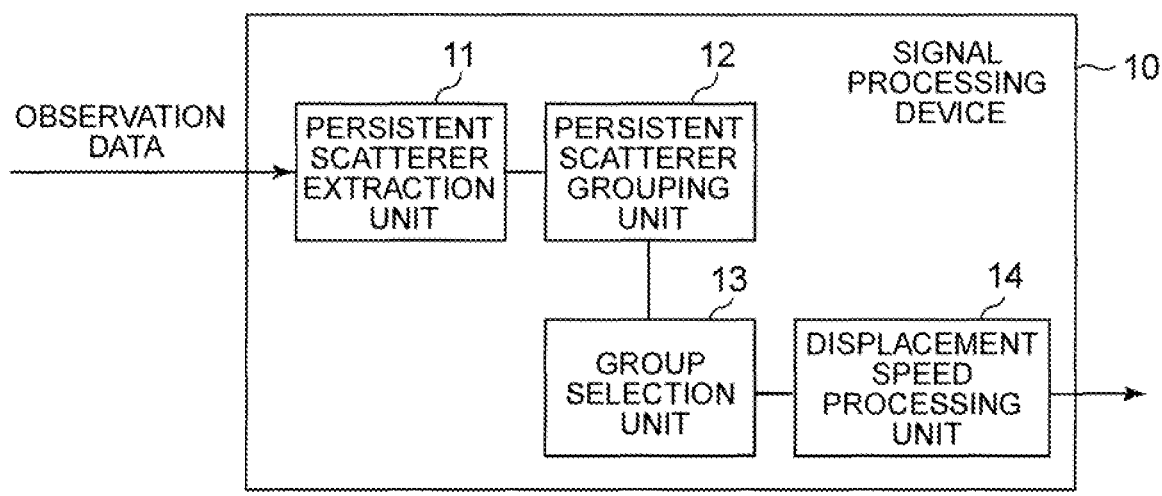
FIG. 15 is a block diagram showing the main part of a synthetic aperture radar signal processing device.

FIG. 15 is a block diagram showing the main part of a synthetic aperture radar signal processing device. The signal processing device 10 shown in FIG. 15 includes: a persistent scatterer extraction unit 11 (in the exemplary embodiments, implemented by the persistent scatterer extraction unit 101) which extracts, from time-series observation data related to an observation target observed from a plurality of observation directions by a radar, a plurality of persistent scatterers in respective observation directions; a persistent scatterer grouping unit 12 (in the exemplary embodiments, implemented by the persistent scatterer grouping unit 102, 106, 107, 108) which groups the plurality of persistent scatterers in each of the observation directions; a group selection unit 13 (in the exemplary embodiments, implemented by the group selection unit 103) which selects, in each of the observation directions, a persistent scatterer group that includes the persistent scatterers included in an analysis target from among groups generated by grouping; and a displacement speed processing unit 14 (in the exemplary embodiments, implemented by the displacement speed calculation unit 104, 109 and the displacement speed synthesis unit 105) which synthesizes displacement speeds of the selected persistent scatterer groups.

Figure 16:
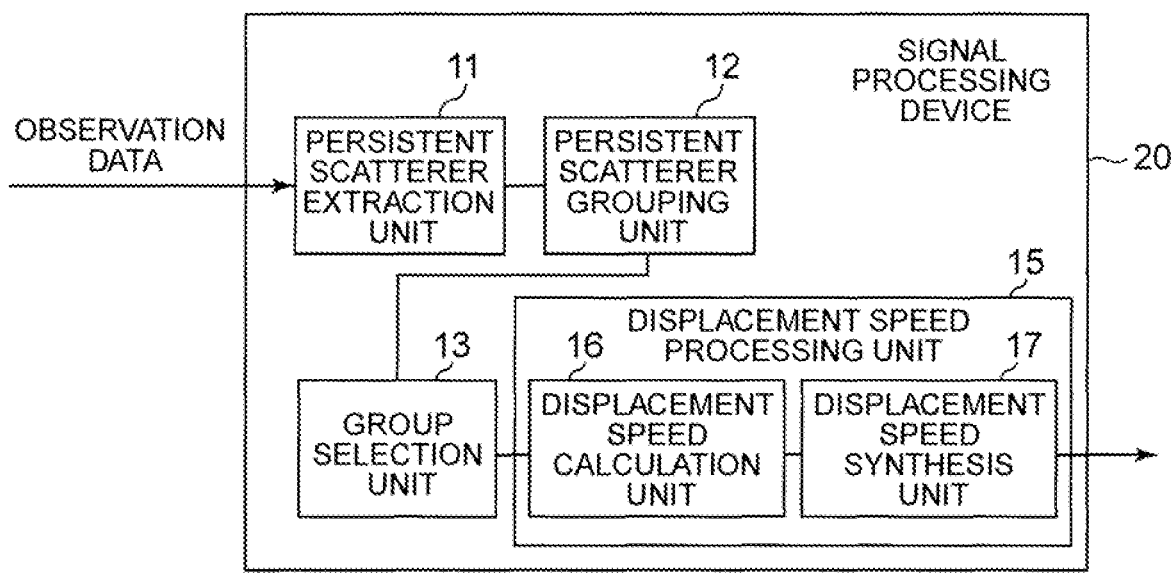
FIG. 16 is a block diagram showing the main part of the synthetic aperture radar signal processing device in another mode.
Figure 17:
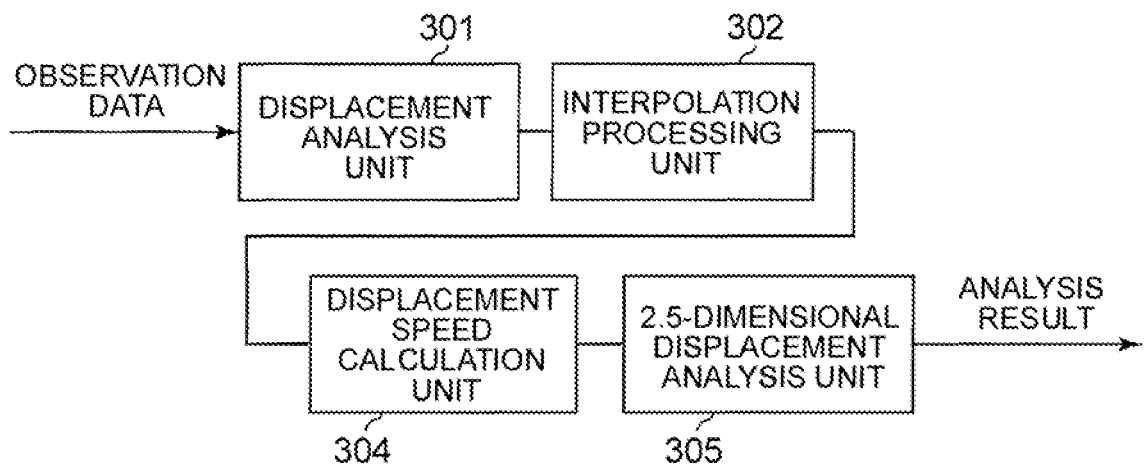
FIG. 17 is a block diagram showing a typical synthetic aperture radar signal processing device.
Figure 18:
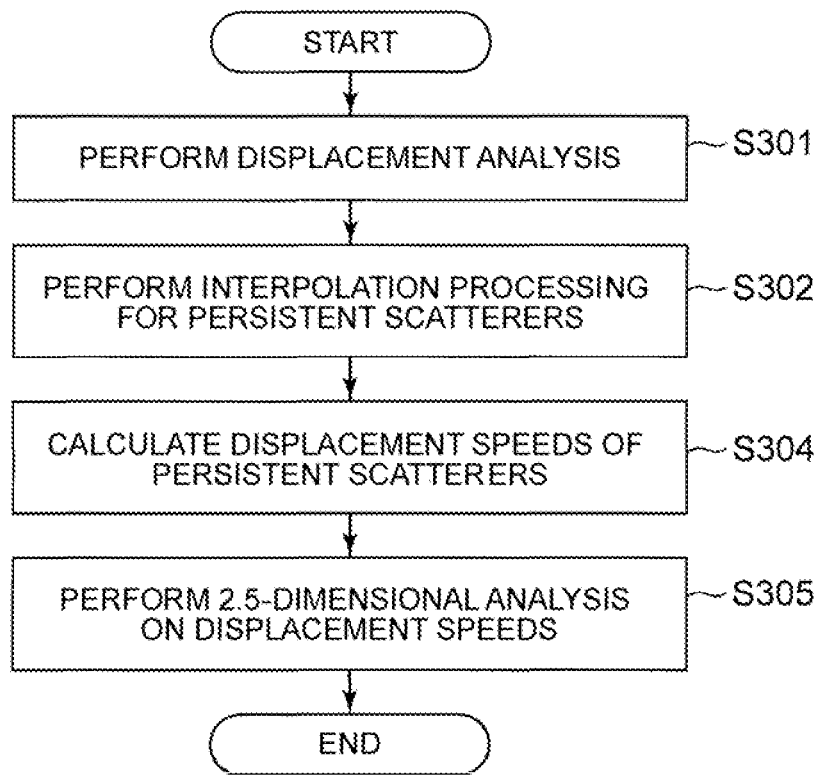
FIG. 18 is a flowchart illustrating an operation of the typical synthetic aperture radar signal processing device.

FIG. 16 is a block diagram showing the main part of the synthetic aperture radar signal processing device in another mode. The signal processing device 20 shown in FIG. 16 is configured such that the displacement speed processing unit 15 includes a displacement speed calculation unit 16 (in the exemplary embodiments, implemented by the displacement speed calculation unit 104, 109) which calculates a displacement speed of the persistent scatterer group selected in each of the observation directions, and a displacement speed synthesis unit 17 (in the exemplary embodiments, implemented by the displacement speed synthesis unit 105) which synthesizes the displacement speeds corresponding to respective observation directions.

A part of or all of the above exemplary embodiments may also be described as, but not limited to, the following supplementary notes.

(Supplementary note 1) A synthetic aperture radar signal processing device, comprising:

a persistent scatterer extraction unit configured to extract, from time-series observation data related to an observation target observed from a plurality of observation directions by a radar, a plurality of persistent scatterers in respective observation directions;

a persistent scatterer grouping unit configured to group the plurality of persistent scatterers in each of the observation directions;

a group selection unit configured to select, in each of the observation directions, a persistent scatterer group that includes the persistent scatterers included in an analysis target from among groups generated by grouping; and a displacement speed processing unit configured to synthesize displacement speeds of the selected persistent scatterer groups.

(Supplementary note 2) The synthetic aperture radar signal processing device according to supplementary note 1, wherein the displacement speed processing unit includes a displacement speed calculation unit configured to calculate a displacement speed of the persistent scatterer group selected in each of the observation directions, and a displacement speed synthesis unit configured to synthesize the displacement speeds corresponding to respective observation directions.

(Supplementary note 3) The synthetic aperture radar signal processing device according to supplementary note 1 or 2, wherein the persistent scatterer grouping unit performs the grouping such that the groups have a size within a predetermined range with respect to a standard size.

(Supplementary note 4) The synthetic aperture radar signal processing device according to any of supplementary notes 1 to 3, wherein the persistent scatterer grouping unit performs the grouping on the basis of a feature that represents a shape of a structure in an observation region.

(Supplementary note 5) The synthetic aperture radar signal processing device according to any of supplementary notes 1 to 4, wherein the displacement speed calculation unit calculates the displacement speeds of the persistent scatterers included in the selected persistent scatterer group, other than displacement speeds that exceed a predetermined threshold value compared to another displacement speed.

(Supplementary note 6) A synthetic aperture radar signal processing method, comprising:

extracting, from time-series observation data related to an observation target observed from a plurality of observation directions by a radar, a plurality of persistent scatterers in respective observation directions;

grouping the plurality of persistent scatterers in each of the observation directions;

selecting, in each of the observation directions, a persistent scatterer group that includes the persistent scatterer belonging to an analysis target from among groups generated by the grouping; and synthesizing displacement speeds of the selected persistent scatterer groups.

(Supplementary note 7) The synthetic aperture radar signal processing method according to supplementary note 6, wherein, when synthesizing the displacement speeds of the persistent scatterer groups,
a displacement speed of the persistent scatterer group selected in each of the observation directions is calculated, and
the displacement speeds corresponding to respective observation directions are synthesized.

(Supplementary note 8) The synthetic aperture radar signal processing method according to supplementary note 6 or 7, wherein the plurality of persistent scatterers are grouped such that the groups have a size within a predetermined range with respect to a standard size.

(Supplementary note 9) The synthetic aperture radar signal processing method according to any of supplementary notes 6 to 8, wherein the plurality of persistent scatterers are grouped on the basis of a feature that represents a shape of a structure in an observation region.

(Supplementary note 10) The synthetic aperture radar signal processing method according to any of supplementary notes 6 to 9, wherein the displacement speeds of the persistent scatterers included in the selected persistent scatterer group are calculated other than displacement speeds that exceed a predetermined threshold value compared to another displacement speed.

(Supplementary note 11) A synthetic aperture radar signal processing program causing a computer to perform the processing of:
extracting, from time-series observation data related to an observation target observed from a plurality of observation directions by a radar, a plurality of persistent scatterers in respective observation directions;
grouping the plurality of persistent scatterers in each of the observation directions;
selecting, in each of the observation directions, a persistent scatterer group that includes the persistent scatterer belonging to an analysis target from among groups generated by the grouping; and
synthesizing displacement speeds of the selected persistent scatterer groups.

(Supplementary note 12) The synthetic aperture radar signal processing program according to supplementary note 11, wherein, when synthesizing the displacement speeds of the persistent scatterer groups,
a displacement speed of the persistent scatterer group selected in each of the observation directions is calculated, and
the displacement speeds corresponding to respective observation directions are synthesized.

(Supplementary note 13) The synthetic aperture radar signal processing program according to supplementary note 11 or 12, wherein the plurality of persistent scatterers are grouped such that the groups have a size within a predetermined range with respect to a standard size.

(Supplementary note 14) The synthetic aperture radar signal processing program according to any of supplementary notes 11 to 13, wherein the plurality of persistent scatterers are grouped on the basis of a feature that represents a shape of a structure in an observation region.

(Supplementary note 15) The synthetic aperture radar signal processing program according to any of supplementary notes 11 to 14, wherein the displacement speeds of the persistent scatterers included in the selected persistent scatterer group are calculated other than displacement speeds that exceed a predetermined threshold value compared to another displacement speed.

(Supplementary note 16) A program causing a computer to execute the synthetic aperture radar signal processing method according to any of supplementary notes 6 to 10.

While the present invention has been described with reference to the exemplary embodiments, the present invention is not limited to the exemplary embodiments above. The configurations and details of the present invention can be subjected to various modifications appreciable by those skilled in the art within the scope of the present invention.

This application claims priority based on Japanese Patent Application No. 2017-241434 filed on Dec. 18, 2017, the disclosure of which is incorporated herein in its entirety.

REFERENCE SIGNS LIST 11 persistent scatterer extraction unit
12 persistent scatterer grouping unit
13 group selection unit
14, 15 displacement speed processing unit
16 displacement speed calculation unit
17 displacement speed synthesis unit
101 persistent scatterer extraction unit
102, 106, 107, 108 persistent scatterer grouping unit
103 group selection unit
104, 109 displacement speed calculation unit
105 displacement speed synthesis unit
116 distance calculation unit
117 phase relationship calculation unit
118 integration unit
119 persistent scatterer exclusion unit
1000 CPU
1001 storage device
1002 memory

What is claimed is:
1. A synthetic aperture radar signal processing device, comprising:
one or more memories storing instructions; and
one or more processors configured to execute the instructions to extract, from time-series observation data related to an observation target observed from a plurality of observation directions by a radar, a plurality of persistent scatterers in respective observation directions;
group the plurality of persistent scatterers in each of the observation directions;
select, in each of the observation directions, a persistent scatterer group that includes the persistent scatterers included in an analysis target from among groups generated by grouping; and
synthesize displacement speeds of the selected persistent scatterer groups,
wherein the one or more processors further execute the instructions to
calculate a displacement speed of the persistent scatterer group selected in each of the observation directions, the displacement speeds being calculated using the persistent scatterers included in the selected persistent scatterer group, other than persistent scatterers having displacement speeds which have a difference of more than a predetermined value with another displacement speed, and
synthesize the displacement speeds corresponding to respective observation directions.
2. The synthetic aperture radar signal processing device according to claim 1, wherein the one or more processors execute the instructions to perform the grouping such that the groups have a size within a predetermined range with respect to a standard size.

3. The synthetic aperture radar signal processing device according to claim 1, wherein the one or more processors execute the instructions to perform the grouping on the basis of a feature that represents a shape of a structure in an observation region.

4. A synthetic aperture radar signal processing method, comprising:

extracting, from time-series observation data related to an observation target observed from a plurality of observation directions by a radar, a plurality of persistent scatterers in respective observation directions;

grouping the plurality of persistent scatterers in each of the observation directions;

selecting, in each of the observation directions, a persistent scatterer group that includes the persistent scatterer belonging to an analysis target from among groups generated by the grouping; and synthesizing displacement speeds of the selected persistent scatterer groups, wherein, when synthesizing the displacement speeds of the persistent scatterer groups, a displacement speed of the persistent scatterer group selected in each of the observation directions is calculated, the displacement speeds being calculated using the persistent scatterers included in the selected persistent scatterer group, other than persistent scatterers having displacement speeds which have a difference of more than a predetermined value with another displacement speed and the displacement speeds corresponding to respective observation directions are synthesized.

5. The synthetic aperture radar signal processing method according to claim 4, wherein the plurality of persistent scatterers are grouped such that the groups have a size within a predetermined range with respect to a standard size.

6. The synthetic aperture radar signal processing method according to claim 4, wherein the plurality of persistent scatterers are grouped on the basis of a feature that represents a shape of a structure in an observation region.

7. A non-transitory computer readable information recording medium storing a synthetic aperture radar signal program, when executed by a processor, performs:

extracting, from time-series observation data related to an observation target observed from a plurality of observation directions by a radar, a plurality of persistent scatterers in respective observation directions;

grouping the plurality of persistent scatterers in each of the observation directions;

selecting, in each of the observation directions, a persistent scatterer group that includes the persistent scatterer belonging to an analysis target from among groups generated by the grouping; and synthesizing displacement speeds of the selected persistent scatterer groups, wherein, when synthesizing the displacement speeds of the persistent scatterer groups, a displacement speed of the persistent scatterer group selected in each of the observation directions is calculated, the displacement speeds being calculated using the persistent scatterers included in the selected persistent scatterer group, other than persistent scatterers having displacement speeds which have a difference of more than a predetermined value with another displacement speed, and the displacement speeds corresponding to respective observation directions are synthesized.

8. The synthetic aperture radar signal processing device according to claim 2, wherein the one or more processors execute the instructions to perform the grouping on the basis of a feature that represents a shape of a structure in an observation region.

9. The synthetic aperture radar signal processing method according to claim 5, wherein the plurality of persistent scatterers are grouped on the basis of a feature that represents a shape of a structure in an observation region.

* * * * *